(12) United States Patent
Drzewiecki

(10) Patent No.: US 11,341,058 B2
(45) Date of Patent: May 24, 2022

(54) HANDLING SOFTWARE PAGE FAULTS USING DATA FROM HIERARCHICAL DATA STRUCTURES

(71) Applicant: VMware Inc., Palo Alto, CA (US)

(72) Inventor: Adrian Drzewiecki, Mountain View, CA (US)

(73) Assignee: VMware Inc., Palo Alto, CA (US)

( * ) Notice: Subject to any disclaimer, the term of this patent is extended or adjusted under 35 U.S.C. 154(b) by 0 days.

(21) Appl. No.: 16/046,829

(22) Filed: Jul. 26, 2018

(65) Prior Publication Data
US 2020/0034310 A1    Jan. 30, 2020

(51) Int. Cl.
*G06F 12/00* (2006.01)
*G06F 12/1009* (2016.01)

(52) U.S. Cl.
CPC .. *G06F 12/1009* (2013.01); *G06F 2212/1008* (2013.01); *G06F 2212/68* (2013.01)

(58) Field of Classification Search
CPC ............ G06F 12/1009; G06F 2212/68; G06F 2212/1008
See application file for complete search history.

(56) References Cited

U.S. PATENT DOCUMENTS

| | | | | |
|---|---|---|---|---|
| 6,393,544 B1 * | 5/2002 | Bryg | ................... | G06F 12/1018 711/202 |
| 6,477,612 B1 * | 11/2002 | Wang | ................. | G06F 12/1009 711/2 |
| 6,738,875 B1 * | 5/2004 | Wang | .................. | G06F 12/0269 707/999.202 |
| 6,785,886 B1 * | 8/2004 | Lim | .................... | G06F 9/45533 711/202 |
| 7,111,145 B1 * | 9/2006 | Chen | .................. | G06F 12/1036 711/206 |
| 2007/0079106 A1 * | 4/2007 | Davis | ................. | G06F 12/1018 711/203 |
| 2010/0318762 A1 * | 12/2010 | Malyugin | ........... | G06F 12/1027 711/207 |
| 2012/0036334 A1 * | 2/2012 | Horman | ................... | G06F 9/52 711/165 |
| 2012/0254499 A1 * | 10/2012 | Hashimoto | ............. | G06F 9/445 711/E12.007 |
| 2014/0032875 A1 * | 1/2014 | Butler | .................... | G06F 21/64 711/208 |

(Continued)

OTHER PUBLICATIONS

Lee et al, Usenix, 'WORT: Write Optimal Radix Tree for Persistent Memory Storage Systems', Feb. 2017, pp. 257-269 (Year: 2017).*

(Continued)

*Primary Examiner* — Arvind Talukdar
(74) *Attorney, Agent, or Firm* — Dentons US LLP

(57) ABSTRACT

The present disclosure relates to handling page faults in a constant time. In particular, a data structure of a fixed height is used to store the page tables, allowing for a constant look up time for a particular page. Further, a virtual address descriptor corresponding to the page is used to obtain and load the data into the corresponding instruction data into the page. The virtual address descriptor is directly accessible from the page obtained from walking the page table. This allows page faults to be handled more efficiently in constant time.

16 Claims, 6 Drawing Sheets

(56) References Cited

U.S. PATENT DOCUMENTS

2018/0107605 A1* 4/2018 Dong .................. G06F 9/45558

OTHER PUBLICATIONS

Weiser et al., ACM, 'Single Trace Attack Against RSA Key Generation in Intel SGX SSL', Jun. 2018, pp. 1-12 (Year: 2018).*
Dolan-Gavitt, "The VAD tree: A process eye view of physical memory", 2007, p. 62-64 (Year: 2007).*
Cohen, "Scanning Memory with Yara". 2017 (Year: 2017).*

* cited by examiner

HANDLING SOFTWARE PAGE FAULTS USING DATA FROM HIERARCHICAL DATA STRUCTURES

FIELD

The present disclosure relates generally to handling page faults in an operating system, and more specifically to handling page faults in constant time.

BACKGROUND

Modern operating systems utilize virtual memory to decouple processes from physical memory. Using virtual memory, the operating system can execute more processes than can be simultaneously stored in the entire physical memory. When a process requests access to physical memory, the request is issued with a virtual address that maps to a physical address to allow for greater generality and flexibility. The request must, however, ultimately be mapped to an address that is issued to the actual physical memory. This mapping, or translation of a virtual address to a physical address is performed during runtime when a process executes an instruction. If the system is unable to translate a virtual address to a physical address, a page fault occurs. Handling a large amount of page faults may be computationally demanding in some instances. Therefore, it is important to reduce the time to handle page faults to deliver better performance.

SUMMARY

The present disclosure describes techniques for handling a page fault in constant time. In particular, a data structure of a fixed height is used to store the page tables, allowing for a constant look up time for a particular page. Once a page is located, a virtual address descriptor is identified by referencing metadata associated with the page. The virtual address descriptor is used obtain and load the data into the corresponding instruction data into the page. Using this technique, page faults are more efficiently handled by eliminating the need to search through additional data structures to locate data to load into the page.

Example methods are described herein. An example method includes detecting an exception associated with the request for the instruction data; in response to detecting an exception associated with the request for instruction data; in response to detecting the exception, obtaining a page table from a data structure, wherein the page table maps a virtual address to a page associated with a physical address, and wherein the page is associated with a virtual address descriptor; accessing the virtual address descriptor to retrieve the instruction data; loading the retrieved instruction data into the page associated with the physical address; and executing the computer-executable instruction using the loaded instruction data.

In some embodiments, a reference to the virtual address descriptor is stored in metadata associated with the page. In some embodiments, the reference to the virtual address descriptor is an indirect reference. In some embodiments, the metadata corresponding to the page is stored in a page frame entry of a page frame database that stores information of one or more page frames. In some embodiments, the page is associated with the page frame entry in the page frame database that stores information of one or more page frames. In some embodiments, the virtual address descriptor includes a reference to an object that includes a reference to the instruction data required by the process to execute the computer-executable instruction.

In some embodiments, the data structure is a radix tree of a fixed height. In some embodiments, the data structure comprises a plurality of page tables and wherein the plurality of page tables are arranged in a hierarchical manner. In some embodiments, the plurality of page tables includes a first page table and a second page table, wherein the data structure includes a first leaf and a second leaf; wherein the first leaf includes the first page table, and wherein the second leaf includes the second page table. In some embodiments, the first page table is different from the second page table. In some embodiments, the method further comprises updating a translation lookaside buffer (TLB) to include the mapping of the virtual address to the physical address.

In some embodiments, the exception is handled in constant time. In some embodiments, the exception comprises a page fault. In some embodiments, the page fault is caused by the process not having access permission to access the page.

Example non-transitory computer-readable media are described herein. An example non-transitory computer-readable storage medium comprises computer-executable instructions for execution by one or more processors of an electronic device with a memory management unit, the computer-executable instructions for: detecting an exception associated with the request for the instruction data; in response to detecting an exception associated with the request for instruction data; in response to detecting the exception, obtaining a page table from a data structure, wherein the page table maps a virtual address to a page associated with a physical address, and wherein the page is associated with a virtual address descriptor; accessing the virtual address descriptor to retrieve the instruction data; loading the retrieved instruction data into the page associated with the physical address; and executing the computer-executable instruction using the loaded instruction data.

In some embodiments, a transitory computer-readable medium is described. The transitory computer-readable storage medium comprising computer-executable instructions for execution by one or more processors of an electronic device with a memory management unit, the computer-executable instructions for: detecting an exception associated with the request for the instruction data; in response to detecting an exception associated with the request for instruction data; in response to detecting the exception, obtaining a page table from a data structure, wherein the page table maps a virtual address to a page associated with a physical address, and wherein the page is associated with a virtual address descriptor; accessing the virtual address descriptor to retrieve the instruction data; loading the retrieved instruction data into the page associated with the physical address; and executing the computer-executable instruction using the loaded instruction data.

Example devices are described herein. An example device (e.g., system) comprises one or more processors and a memory management unit, the one or more processors configured for: detecting an exception associated with the request for the instruction data; in response to detecting an exception associated with the request for instruction data; in response to detecting the exception, obtaining a page table from a data structure, wherein the page table maps a virtual address to a page associated with a physical address, and wherein the page is associated with a virtual address descriptor; accessing the virtual address descriptor to retrieve the instruction data; loading the retrieved instruction data into the page associated with the physical address; and executing the computer-executable instruction using the loaded instruction data.

An example device comprises one or more processors and a memory management unit, the one or more processors configured for: means for detecting an exception associated with the request for the instruction data; in response to detecting an exception associated with the request for instruction data; means for in response to detecting the exception, obtaining a page table from a data structure, wherein the page table maps a virtual address to a page associated with a physical address, and wherein the page is associated with a virtual address descriptor; means for accessing the virtual address descriptor to retrieve the instruction data; means for loading the retrieved instruction data into the page associated with the physical address; and means for executing the computer-executable instruction using the loaded instruction data.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

The present disclosure provides techniques for handling a software page fault in constant time. The operating system (or one or more other processes) receives a request to execute a computer-executable instruction from a process, where the request indicates that instruction data is located at a virtual address. The system uses the virtual address to request the instruction data located at a corresponding physical address. A page fault is detected by the system when the system is unable to access the instruction data at the corresponding physical address. In some embodiments, the page fault results when the virtual address being accessed is not backed by a physical page. In some embodiments, the instruction itself is attempting to manipulate data at the virtual address which is not yet backed. In some embodiments, the permissions for the virtual address are such that the system is unable to access the instruction data. In response, the system obtains a page table from a data structure, where the page table maps the virtual address to a page at the corresponding physical address. The system accesses a virtual address descriptor, which is referenced to by the page obtained from the page table, to load the instruction data into the page at the corresponding physical address. Once the page tables are updated, the system executes the computer-executable instruction using the obtained instruction data.

Figure 1:
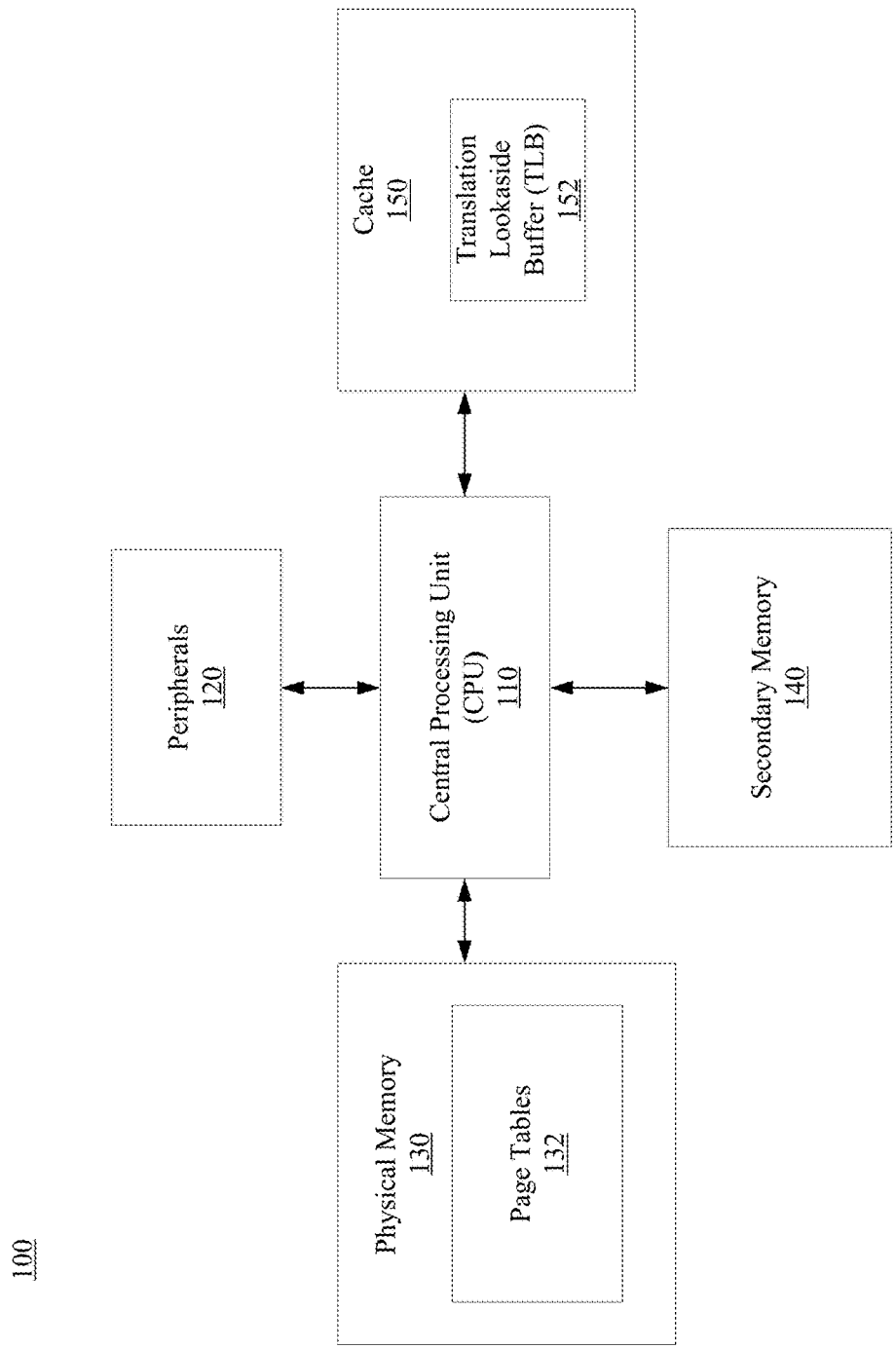
FIG. 1 depicts a block diagram illustrating an exemplary computing system according to an embodiment of the present invention.

FIG. 1 is a block diagram illustrating exemplary computing system 100 according to an embodiment of the present invention. System 100 includes resources that include but are not limited to central processing unit (CPU) 110, physical memory 130, secondary memory 140, and peripherals 120. System resources used to execute processes (e.g., application programs) include hardware components, such as CPU 110 (including memory management unit (MMU)), physical memory 130, secondary memory 140, and peripherals 120. In some embodiments, the operating system is the underlying control program that manages resources of computing system 100. In some embodiments, a memory manager is a component in the operating system that manages the processes running in system 100. In some embodiments, the memory manager utilizes the MMU to manage memory.

It is to be understood that the illustrated example of the computing system 100 depicts selected elements of a general purpose computing system and is not intended to illustrate a specific computer architecture. For example, in FIG. 1, physical memory 130 and CPU 110 may be integrated into a single component, while in other examples physical memory 130 and CPU 130 may be discrete components. Further, it should be recognized that other arrangements of the components of computing system 100 can be used without departing from the scope of the various described embodiments.

In some embodiments, physical memory 130 is a high speed random access memory (RAM), such as double data rate (DDR) SDRAM. In some embodiments, secondary memory 140 includes non-volatile memory, such as magnetic disk storage devices, flash memory devices, and/or other non-volatile solid-state memory devices. In some embodiments, physical memory 130 and/or secondary memory 140 are configured to store instructions for performing the methods and processes described herein. In some embodiments, peripherals 120 include any known I/O devices including but not limited to displays (e.g., touch-sensitive displays), keyboards, mice, input control devices, and any other devices that may receive inputs or provide outputs.

Generally, processes executing on the system 100 are stored in physical memory 130 such that instructions for the processes may be quickly executed by the CPU 110. In some instances, however, processes (e.g., application programs) executing on system 100 may require more memory capacity than is available to the process in physical memory 130. Accordingly, additional memory capacity is made available to the process by way of virtual memory.

In some embodiments, virtual memory (e.g., virtual memory 210, 211, and 212) is a storage allocation scheme in which a process (e.g., application program) uses virtual addresses to access data stored in memory. To the process, all data accessed by the process appears as being stored in physical memory 130, despite that at least a portion of data corresponding one or more of the virtual addresses may be stored in secondary 140. In other words, the process can request data stored in portions of secondary memory 140 as if it were stored in physical memory 130. If a process requires data, and the data is stored in secondary memory 140, the memory manager of the operating system (e.g., a memory management process of operating system) detects the event as a page fault, and in response transfers (e.g., fetches) the data from secondary memory 140 to physical memory 130, such that the process can access the data using the virtual address. In some embodiments, a mapping between virtual addresses and physical addresses is maintained using one or more page tables 132, stored in physical memory 130.

In some embodiments, the memory manager provides virtual memory (e.g., virtual memory 210, 211, and 212) to a process by way of a virtual address space. In some embodiments, a virtual address space is divided into units of memory called virtual pages, where each virtual page corresponds to a virtual address. Similarly, physical memory 130 is divided into continuous blocks of memory called page frames (e.g., physical pages), where each page frame has a corresponding physical address. In some embodiments, a physical page and a page frame are the same size. Each virtual page is backed by a physical page frame in physical memory. Accordingly, each virtual address of a virtual page corresponds to a physical address of a page frame, which is where the data for the virtual page is stored.

In some embodiments, the memory manager references a translation lookaside buffer (TLB) 152, which serves as a hardware memory cache used to determine a physical memory location in response to request for data at a virtual address. As further discussed in detail below, when a TLB miss occurs (e.g., when TLB 152 does not include a mapping of a virtual address to a physical address), the operating system searches for the corresponding physical address in one or more virtual pages using a page walk operation. In some embodiments, a TLB miss results in a page table look up in hardware, where a further miss in the page table look up results in the OS memory manager handling the address translation.

Figure 2:
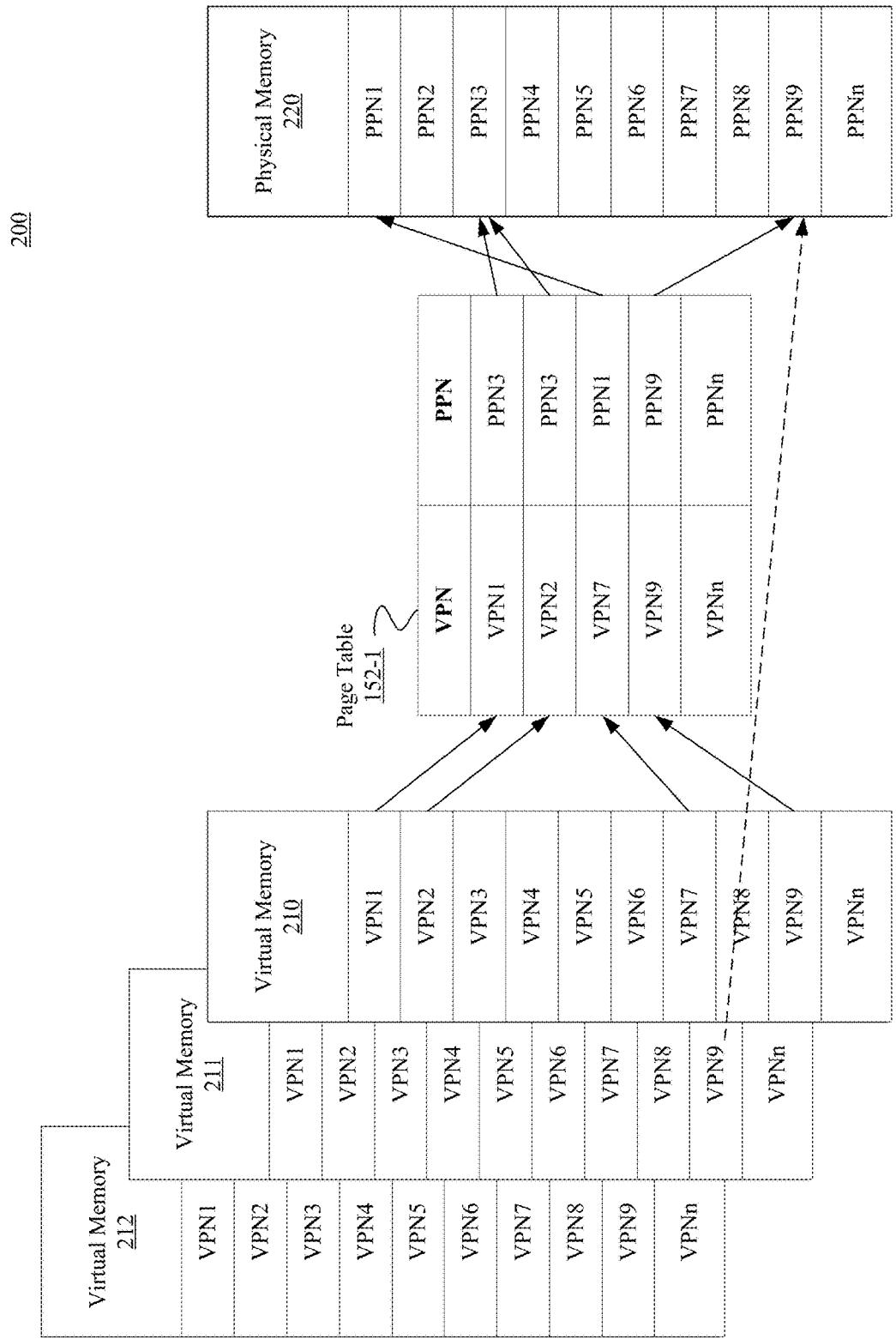
FIG. 2 depicts an exemplary page table that maps virtual addresses in virtual memory to physical addresses in physical memory according to an embodiment of the present invention.

In some embodiments, the virtual pages are organized in page tables 132, which are used by the operating system to lookup the physical address of the page frame that includes the data for the corresponding page, as illustrated in FIG. 2. In some embodiments, each process has a respective set of page tables that are shared with each thread of the process. Thus, as CPU 110 switches from a first process to a second process during execution, page tables (e.g., page tables 132) corresponding to the second process must also be swapped into physical memory 130.

FIG. 2 illustrates an exemplary page table 152-1 mapping between virtual memory (e.g., virtual address spaces 210-212) and physical memory (e.g., physical address space 220) according to an embodiment of the present invention. In some embodiments, exemplary page table 152-1 is used to implement a page table of page tables 152 (FIG. 1). As described, each process executing on system 100 is allocated a respective virtual address space and set of page tables 152 that stores address translations for the virtual address space (i.e., a mapping of virtual addresses to physical addresses) of the process. For example, virtual address space 210 corresponds to a first process, virtual address space 211 corresponds to a second process, and virtual address space 212 corresponds to a third process. In some embodiments, each virtual address space is divided into virtual pages (e.g., $VPN1\text{-}VPN_n$), where each virtual page has a corresponding virtual address. Each virtual address is associated with a physical address where data corresponding to the virtual address is located in physical memory 220, as indicated by page table 152-1.

In some embodiments, physical memory (e.g., physical memory 220) is divided into page frames, where each page frame (e.g., $PPN1\text{-}PPN_n$) has a physical address. In some embodiments, multiple VPNs (e.g., VPN1, VPN2) within the same virtual address space (e.g., 210) map to the same PPN (e.g., PPN3). In some embodiments, multiple VPNs from different virtual address spaces (e.g., virtual address spaces 210, 211) map to the same PPN (e.g., PPN 9).

In some embodiments, during operation, operating system 120 detects a page fault when a process attempts to access a page at a virtual address not backed by a page frame. In response to the page fault, operating system 120 suspends the process while locating the requested page in a paging file or secondary memory 160. If the requested page is located in secondary memory 160 (e.g., hard drive, disk), the page must be restored to physical memory 150 before the page is accessible to the process.

In some embodiments, once the virtual address is determined to be valid (e.g., the virtual page has been allocated and the access permissions are proper), the memory manager checks the TLB to obtain a mapping between the virtual address and a physical address. If a TLB miss is detected, the memory manager reads the page from secondary memory 160 and copies it into physical memory 150. In some embodiments, the TLB is used as an optimization, where a TLB miss is followed by a page table lookup in hardware.

In some embodiments, the memory manager determines whether a page frame in physical memory 150 is available. If so, the memory manager allocates a page frame in physical memory 150 and copies over the data from secondary memory 160 into the page frame.

In some embodiments, if a page frame is not available, the memory manager evicts an existing page using a page replacement algorithm (e.g., LRU algorithm) and frees the page in the page frame for use. In some embodiments, the evicted page is copied to secondary memory 160. In some embodiments, the evicted page is moved to a paging file. The paging file stores a limited number of evicted pages to allow them to be quickly retrieved upon later request.

Once the page in physical memory 150 is updated to include the requested data, page tables (e.g., page tables 152) and the TLB (e.g., TLB 142) are updated to reflect the new mapping between the virtual address and the new physical address of the page. Control is returned to the process to execute the instruction.

Figure 3:
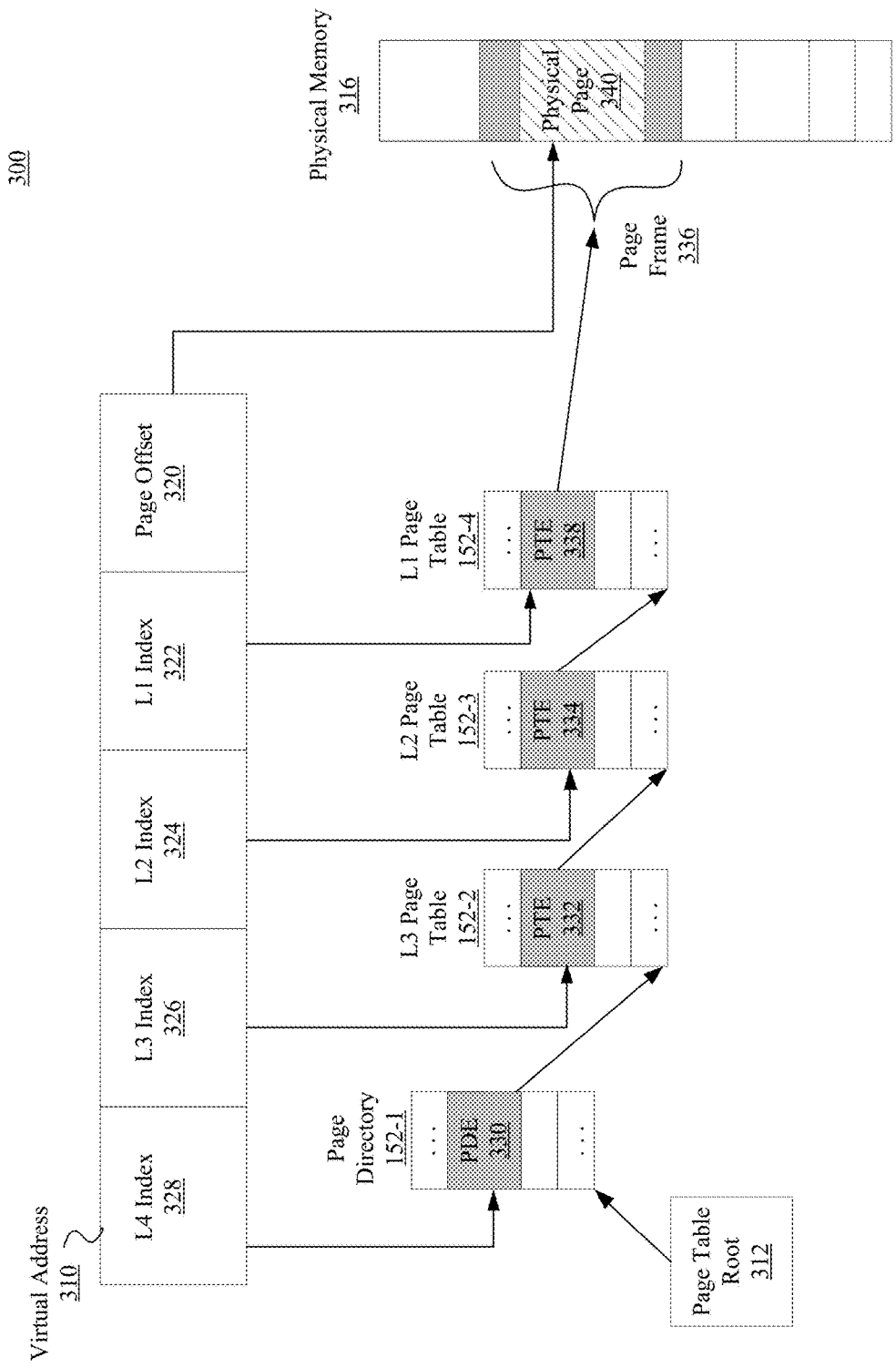
FIG. 3 depicts an exemplary hierarchical data structure storing page tables according to an embodiment of the present invention.

Generally, in response to a page fault, the memory manager of an operating system performs a page walk to locate the corresponding physical address associated with a virtual address. As shown in FIG. 3, in some embodiments, page tables of a process are organized in a hierarchical data structure. In some embodiments, the data structure is an array, a linked list, a skip list, or any combination thereof. In some embodiments, the data structure is a tree, such as a radix tree. In some embodiments, optimized data structures such as radix trees allow page table look ups to be performed in constant time.

FIG. 3 illustrates an exemplary data structure 300 implementing a fixed, multi-level (e.g., four-level) hierarchy of page tables. Using a data structure 300 of a fixed height improves the lookup time to a constant lookup time in some examples. In contrast to systems that use data structures of O(log n) look up time (by virtue of using a variable height data structure), a fixed height data structure essentially supports an array-like lookup where the virtual address provides an index into the array. Since page faults occur frequently, the constant lookup time allows the system to respond more efficiently. The initial page table located at the highest level of the data structure, or page directory (e.g. page directory 152-1), is referenced by page table root pointer (e.g., root pointer 312) and includes page directory entries (PDE) (e.g., PDE 330) that point to the addresses of a sublevel page table (e.g., page table 152-2). In some embodiments, page table root pointer 312 is stored in a hardware register. Each page table contains page table entries (PTE), in which each PTE points to the address of the next level page table, or if the page table is the lowest level page table, the PTE (e.g., PTE 338) points to the address of a particular physical page frame (e.g., page frame 336).

In some embodiments, the memory manager uses virtual address 310 to navigate through the hierarchy of page tables to locate physical page 340, as described. In some embodiments, a predetermined number of bits in the virtual address is used to index to each sublevel page table to find the resulting page. In some embodiments, exemplary virtual address 310 contains at least five fields (e.g., L4 index bits 328, L3 index bits 326, L2 index bits 324, L1 index bits 322, and page offset bits 320) that are used to traverse respective levels of page tables to locate physical page 340. It will be appreciated that virtual address 310 may include any number of fields for traversing page tables.

In some embodiments, the virtual address 310 may include additional fields that are not used for indexing (e.g., to determine a physical address). For instance, additional fields and other metadata are used by the hardware and the memory manager to maintain control information associated with the virtual address. In some embodiments, the virtual address includes a valid bit that indicates whether the physical page located at the address in the PTE is valid. If the bit has a first state (e.g., the bit is enabled), this indicates the physical page reference is valid and that the data needed by the process is available at the physical page. If the valid bit has a second state (e.g., the bit is disabled), the remaining bits in the virtual address are used by the memory manager to find the data in secondary memory and copy the information into the physical page. In some embodiments, a field in the virtual address is used to indicate (e.g., identify) the paging file used to store the data contents of the page. Thus, when the page is subsequently requested, the memory manager can update the PTE to point to the location of the page in the page file.

In some embodiments, additional fields in the virtual address include an accessed bit (or bits), a dirty bit, a reading permission bit, and a writing permission bit. The accessed bit tracks a time at which the page was last accessed, and the dirty bit tracks whether the page has been modified and not yet written to disk. The permission bits indicate whether the page is readable or writeable, respectively. When permissions for the page do not match the access requested by the memory manager, a page fault results. In some embodiments, the number of bits for each field may vary or be the same. In some embodiments, the number of fields in virtual address 410 may include fewer or more fields. Typically, the size of the virtual address space is dependent on the number of levels of page tables, the size of the smallest page, the size of the virtual address, and the size of the physical address.

In some embodiments, the memory manager uses page table root 312 to perform a page walk. At the topmost level, page directory 152-1 indexes a set of level three (L3) page tables. The memory manager uses L4 index 328 from the virtual address to determine the relevant L3 page table stored in PDE 330 from page directory 152-1. PDE 330 points to the L3 page table 152-2. Similarly, the memory manager uses L3 index 326 to identify PTE 332 that points to the next level L2 page table 152-3 and L2 index 324 to identify PTE 334 that points to L1 page table 152-4. L1 page table 152-4 indexes a set of page frames. The memory manager uses L1 index 322 to identify PTE 338 that points to the address of page frame 336. Each page frame 336 corresponds (e.g., maps) to a region of physical memory where a physical page (e.g., physical page 340) is stored. Page frame 336 maps to a physical page 340 within the range of memory addresses of page frame 336. In some embodiments, the page frame contains a single physical page (e.g., physical page 340). Page offset 320 is used to determine the physical address of page 340 within the page frame 336 in physical memory. Physical address 318 comprises the address of page frame 336 and page offset 320, where page offset 320 is the same offset that is stored in virtual address 310. The memory manager uses the physical address to locate the requested data that is stored at the specified page in secondary memory.

Once the memory manager has located the physical page that corresponds to the virtual address, the memory manager copies the data into a new physical page or to an existing, reallocated physical page. In some embodiments, the memory manager updates PTE 338 in the L1 page table corresponding to the virtual address to point to the location of the page (e.g., PPN 336) containing the data in the paging file when the page is still in physical memory. In some embodiments, the PTEs of higher level page tables may also need to be updated.

In some embodiments, once the memory manager has retrieved the page by performing a page walk, the memory manager determines the location of the data corresponding to the page in secondary memory. In some embodiments, the operating system uses a data structure describing usage of the virtual address by a process, or virtual address descriptor (VAD), to locate the corresponding data.

In some embodiments, a VAD is generated by the memory manager when a process allocates memory in the virtual address space. Accordingly, in some embodiments, the memory manager generates and maintains one or more VADs for each process executing in a system, such as the system 100. Each VAD stores information provided by a respective process, such as the range of addresses for the virtual address space (e.g., virtual memory 210, 211, and 212), whether the range of addresses will be shared, whether a child process can inherit contents of the range of addresses, the type of paging used in the virtual address space, and access permissions to the pages in the range of addresses. In some embodiments, each VAD describes a range of virtual pages (e.g., $VPN_1$ and $VPN_N$), data associated with the process, and the status of the process' address space. In some embodiments, the VAD also describes whether the memory is backed by a data file and, if so, further provides information about the data file.

Figure 4:
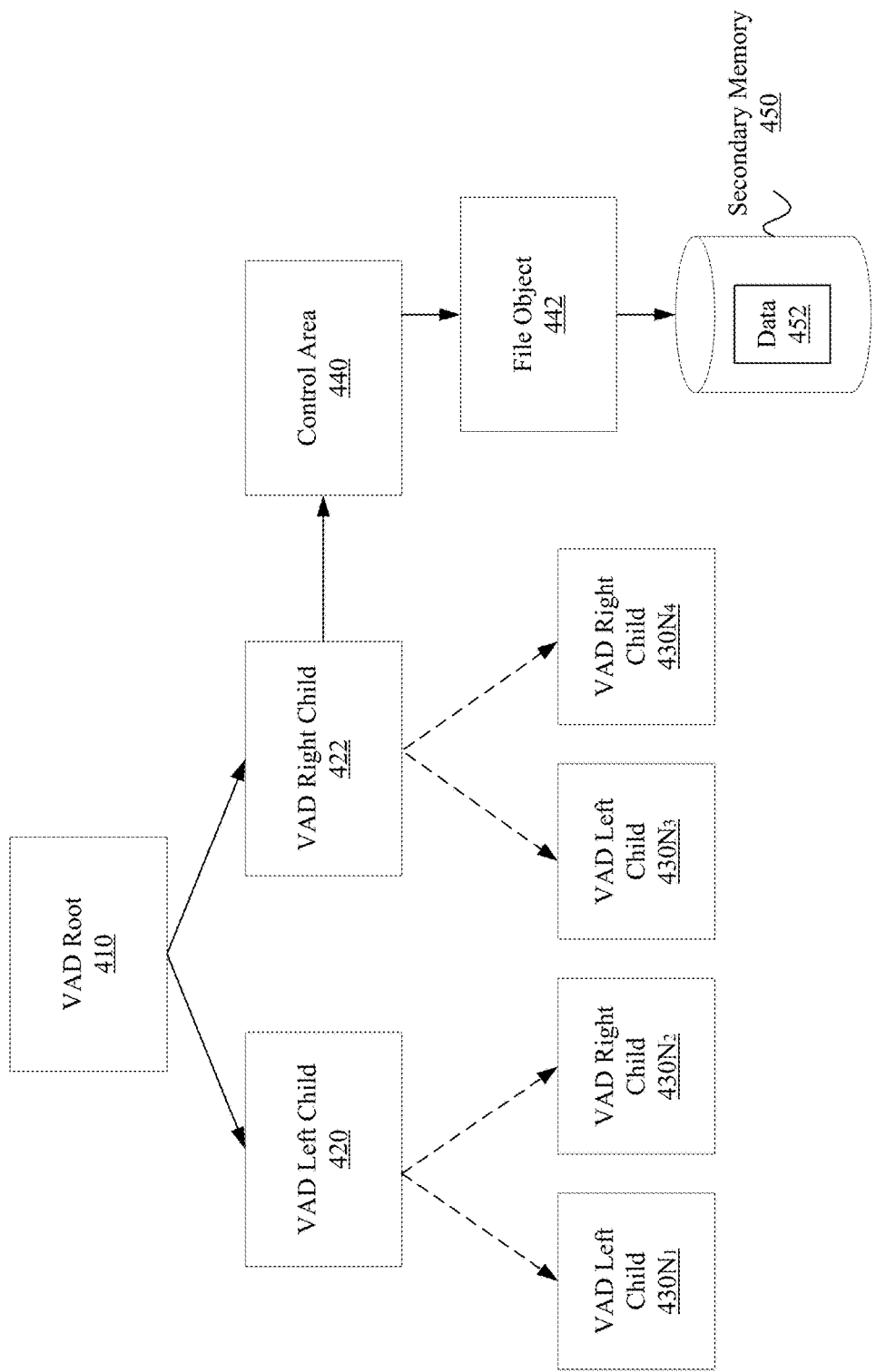
FIG. 4 depicts an exemplary tree data structure storing virtual address descriptors according to an embodiment of the present invention.

FIG. 4 illustrates an exemplary tree data structure 400 comprising a plurality of VADs (e.g., 410, 420, 422, $430N_{1-4}$) that may, for instance, be implemented as nodes of tree 400. Each VAD (e.g., VAD root 410) includes at least a pointer to a left child VAD (e.g., VAD 420) and a right child VAD (e.g., VAD 422). In some embodiments, each VAD is implemented as a balanced tree where the root node (e.g. VAD root 410) of the VAD tree (e.g., VAD tree 400) is stored in a data structure corresponding to the process. In some embodiments, data structures used in this manner are arrays, linked lists, skip lists, balanced binary trees (e.g., red-black trees or splay trees) or any combination thereof. The runtime to traverse tree 400 is O(log n).

Once a VAD is identified, a pointer stored in the VAD is used to determine the location of the data needed by the process. In some embodiments, the pointer in the VAD points to a control area data structure that stores the location of the data needed by the process. For example, VAD 422 includes a pointer to a control area data structure 440 that in turn points to a file object 442. In some embodiments, file object 442 maintains the locations of data 452 utilized by a corresponding process in secondary memory 450. In some embodiments, the control area data structure 440 stores detailed information about other objects which contain pointers to the file objects of the requested data backed by the data file. In some embodiments, data 452 associated with the process includes an executable application program and, optionally, a set of dynamic link libraries (DLLs) that are used by the process. In some embodiments, the VAD also stores metadata (e.g., executable applications and DLLs) associated with the process.

In an example operation, the memory manager uses VAD 422 to locate data 452 (e.g., a page) in secondary memory 450 (e.g. disk or hard drive) by performing a VAD walk. The VAD walk is performed using the virtual address to find the corresponding data 452. In some embodiments, the VAD walk includes traversing a VAD tree (e.g., VAD tree 400) to find the corresponding VAD (e.g., VAD 422) in order to locate and copy the data (e.g., a page) from secondary memory 450 to a physical page identified by the page lookup. In some embodiments, in a red-black tree implementation, the lookup time for performing the VAD walk is O(log n). In other embodiments, as described below, the VAD look up time may be improved to a constant time operation by utilizing the virtual address of a page frame to directly look up the corresponding VAD without having to perform a VAD walk. A constant time VAD lookup expedites the time required to handle a page, which allows the operating system to handle page faults more efficiently.

Figure 5:
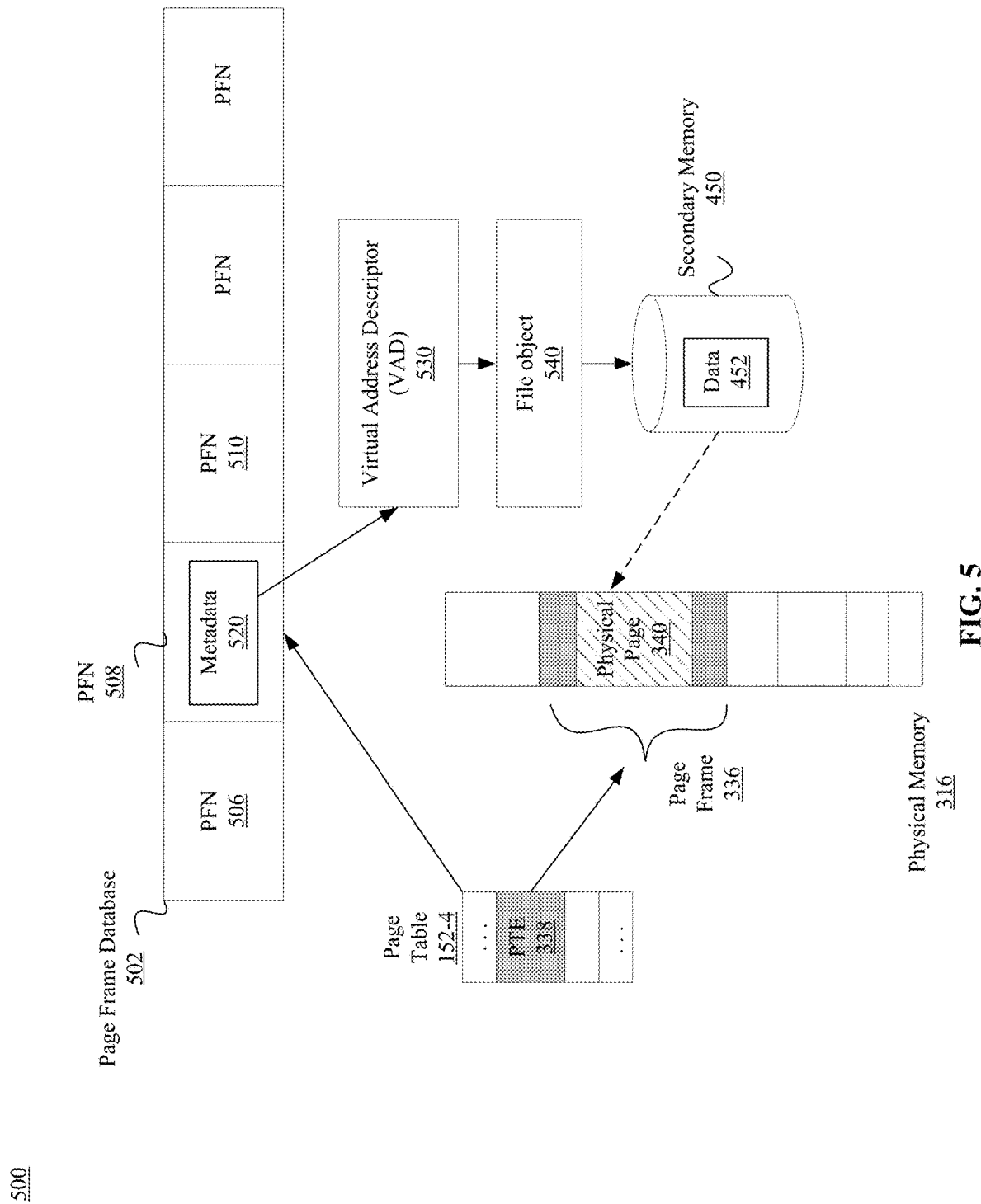
FIG. 5 depicts an exemplary page frame that is associated with a virtual address descriptor according to an embodiment of the present invention.

In FIG. 5, diagram 500 illustrates data retrieval without performing a VAD walk. In particular, diagram 500 illustrates accessing a VAD by utilizing a page frame database (PFD) 502 to map a page frame (e.g., page frame 336) directly to a corresponding VAD (e.g., VAD 530), thus eliminating the VAD walk.

In some embodiments, PFD 502 is an array or a list including a page frame entry (PFN) (e.g., PFN 510) for every valid page frame (e.g., page frame 336) in the system, and accordingly may serve as a database for monitoring the status of every valid page frame. In some embodiments, PFD 502 is maintained by the memory manager, which uses the PFD 502 to track the status of each physical page, such as whether each physical page is used or available, allowing the memory manager to determine which pages of memory are best to use or reuse. In some embodiments, PFD 502 is an array that corresponds to the physical pages used by the system. In some embodiments, PFD 502 corresponds to the same physical pages as those referenced by the page tables (e.g., page tables 152-2, 152-3, 152-4) such that each PFN (e.g., PFN 510) corresponds to a page frame (e.g., page frame 336). In some embodiments, a particular VAD may be obtained directly by using the PFN obtained from the page walk.

In some embodiments, a pointer to VAD 530 is stored as metadata 520 in PFN 508 of PFD 502. In some embodiments, PTE 338 is within the range of virtual addresses encompassed by VAD 530. In some embodiments, PFN 508 also maintains a reference page table 152-4. PFN 508 is directly accessed by using the offset of page table 152-4. For example, after performing the page walk to obtain the physical address for page frame 336, the L1 page table 152-4 physical address may be used to retrieve PFN 508 at the corresponding index of PFD 502. In some embodiments, each page table and PTE offset points to a corresponding PFN in PFD 502. For example, page table 152-4 points to PFN 508 and PTE 338 of page table 152-4 points to PFN 510. Thus, looking up a VAD for a given virtual address is the same operation as performing the page walk for a given page frame. This results in the VAD look up being constant time. In some embodiments, the memory manager uses metadata 520 to directly access VAD 530 in PFD 502 after obtaining the address of physical page 340 using a page walk. In some embodiments, metadata 520 contains an offset within the VAD that is used to access data 452. In some embodiments, the physical address of page frame 336 and the page offset 320 are used to find the index of PFN 510 in PFD 502. In some embodiments, physical page 340 corresponds to PFN 510, once the physical page has been located or memory for the physical page has been allocated. Once the memory manager locates VAD 530, the memory manager employs VAD 530 to locate file object 540, and in turn uses file object 540 to locate data 452 in secondary memory 450. Once the location of data 452 is determined, the memory manager copies data 452 to physical page 340, and in accordance with updating the page tables and TLB, returns control to the process. Thus, by storing a pointer to a VAD in a PFN entry corresponding to a page frame, an additional VAD walk is eliminated.

In some embodiments, contention between threads simultaneously attempting to access the same VAD causes a delay in the handling of the page fault as a thread may have locked the requested VAD. By using the virtual address to look up the VAD in an array structure (e.g., PFD 502), contention between threads is resolved by allowing a read-copy update (RCU) function to be used as a synchronization mechanism to support multiple processes reading the VADs simultaneously without locking the VADs. RCU synchronization accomplishes this by using a grace period in which readers may read the VAD before the VAD is locked for updating. The use of RCU eliminates the need for synchronization mechanisms between threads to ensure that stale VADs are not being accessed. In some embodiments, RCU are not optimal for use with data structures that require re-balancing, such as tree structures, because the re-balancing operation involves duplicating copies of the tree, which adds additional complexity. In contrast, using the virtual address to look up the VAD from an array structure allows RCU synchronization to be used instead of coarse grained locks, which are traditionally used but are less efficient.

Figure 6:
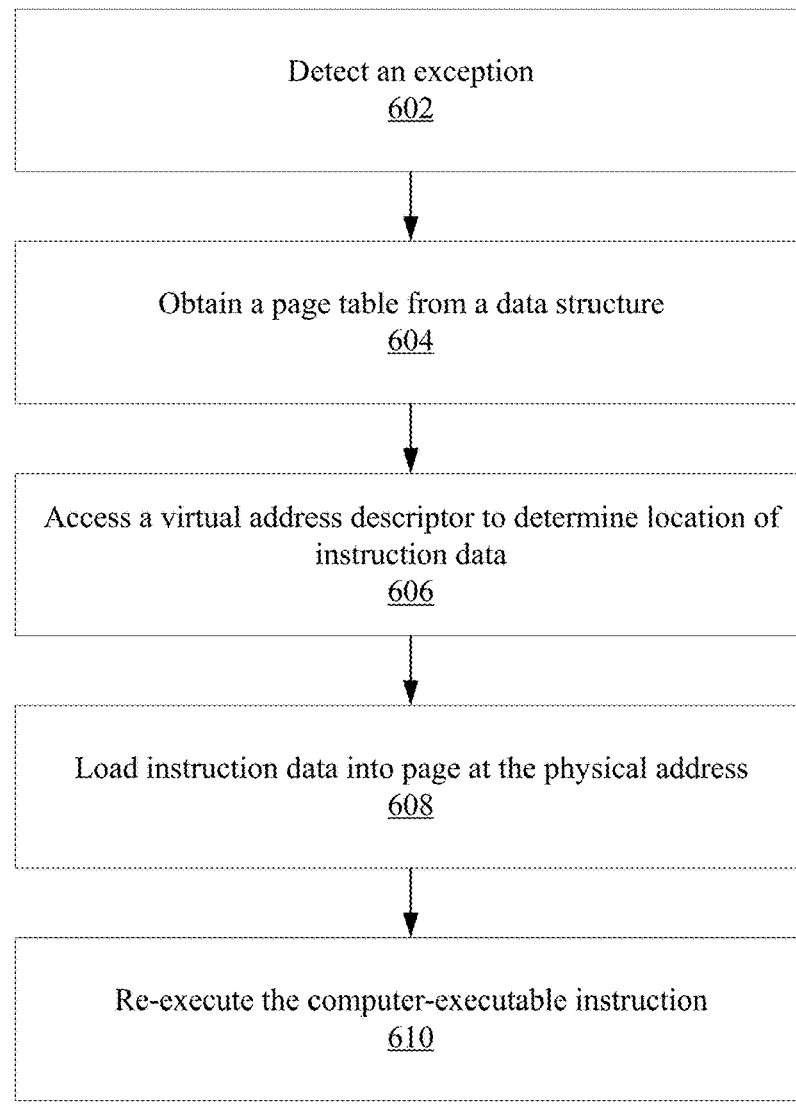
FIG. 6 depicts an exemplary method for handling a page fault in constant time according to an embodiment of the present invention.

In the description below, process 600 is described as being performed by computing system 100. It should be appreciated that the order for performing the blocks of FIG. 6 can be modified. Further, one or more blocks of process 600 can be optional and/or additional blocks can be performed.

At block 602, the computing system detects an exception associated with a request for instruction data as a result of receiving a request from a process to execute a computer-executable instruction, where the instruction is associated with instruction data located at a virtual address. In some embodiments, the computing system receives the request to execute the computer-executable instruction when a user executes an application. In some embodiments, a computing system receives the request when the user switches between a first application and a second application. In some embodiments, the computing system comprises an operating system.

The operating system allocates a virtual address space for each process, where the virtual address space contains a mapping of a virtual address to a physical address where the actual instruction, image of the executable program, libraries, symbols, and additional instruction data are stored. In response to receiving the request to execute the computer-executable instruction, the operating system uses the virtual address to translate the address to a corresponding physical address where the instruction data is located. In some embodiments, the operating system looks up the physical address in the TLB using the virtual address. In some embodiments, the operating system looks up the physical address in a page table using the virtual address. In some embodiments, the operating system uses other system metadata to determine a corresponding physical address.

In some embodiments, the exception is detected when the operating system is unable to determine a physical address corresponding to the virtual address or access the physical address. In some embodiments, the exception is a page fault. In some embodiments, the page fault is triggered when there is a TLB miss. In some embodiments, the TLB contains a mapping, but the corresponding physical address is in secondary memory. In some embodiments, a page fault occurs when the virtual address is not valid or is not accessible as a result of access permissions not being set. In some embodiments, contention between two threads of the process or between two processes prevents the system from accessing the virtual address or the physical address or both, thereby causing a page fault.

At block 604, in response to detecting the exception, the operating system obtains a page table from a data structure, wherein the page table maps the virtual address to a page at the corresponding physical address. In some embodiments, the data structure is a hierarchical data structure with a fixed height or fixed number of levels. In some embodiments, the data structure is a tree structure, such as a red-black tree, binary tree, self-balancing tree, radix tree, or AVL tree. In some embodiments, the data structure is an array, a linked list, or a skip list. In some embodiments, the operating system performs a page walk through the data structure to determine a page table entry that indicates the location of the physical page at the corresponding physical address. In some embodiments, the page walk is performed by the operating system in constant time. In some embodiments, the page walk is performed by the operating system in a log n time. In some embodiments, the data structure contains a page table directory at the highest level. In some embodiments, the page table directory points to other sublevel page tables. In some embodiments, a page table may contain page table entries that point to a lower level page table. In some embodiments, a page table may point directly to a page frame in physical memory. In some embodiments, the physical address may be obtained by combining the address of the page frame and the page offset. In some embodiments, the page offset is obtained from the virtual address.

At block 606, once the operating system obtains the physical address, the system utilizes the VAD corresponding to the process to determine the location of the instruction data. In some embodiments, the instruction data in a physical page located in the physical address. In some embodiments, the instruction data is stored in secondary memory. In some embodiments, the instruction data is stored in various pages in physical memory. In some embodiments, the operating system retrieves the VAD using metadata stored in a page frame entry of the PFD, which is maintained by the system. In some embodiments, the operating system performs a VAD walk to identify the relevant VAD. Once the operating system retrieves the VAD, the operating system may access an object from the VAD that points to the location of the instruction data.

At block 608, once the location of the page containing the instruction data is located, the operating system loads the instruction data to the page located at the physical address. In some embodiments, the operating system makes a copy of the instruction data located in secondary memory to a page in physical memory. In some embodiments, the operating system updates the PTEs of the page tables to have the virtual address point to the location of the page containing the instruction data from the paging tile. In some embodiments, the virtual address to physical address mapping is updated in the TLB. At block 610, the operating system returns control back to the process to re-execute the computer-executable instruction, which will now be found in the physical address corresponding to the virtual address.

The foregoing descriptions of specific embodiments, as described with reference to FIGS. 1-6, have been presented for purposes of illustration and description. They are not intended to be exhaustive or to limit the scope of the claims to the precise forms disclosed, and it should be understood that many modifications and variations are possible in light of the above descriptions.

What is claimed is:

1. A method of handling page faults in an operating system utilizing virtual memory, the method comprising:
   detecting a page fault associated with a request for instruction data directed to a virtual address;
   in response to detecting the page fault:
      obtaining a page table from a first data structure, wherein the page table maps the virtual address to a page associated with a physical address;
      retrieving metadata from a page frame entry in a page frame database using the physical address associated with the instruction data, wherein the page frame database is separate and distinct from the page table and wherein the page frame database comprises a plurality of page frame entries associated with two or more applications of a plurality of applications running on the operating system associated with the instruction data;
      directly looking up a virtual address descriptor (VAD) from within a second data structure arranged in a hierarchical manner using the metadata, wherein the metadata comprises a pointer that is used to directly lookup the VAD without performing a VAD walk of the second data structure;
      accessing the virtual address descriptor to retrieve the instruction data;
      loading the retrieved instruction data into a page associated with the physical address; and
      executing a computer-executable instruction using the loaded instruction data.

2. The method of claim 1, wherein obtaining the page table from the first data structure comprises performing a page walk of the first data structure.

3. The method of claim 2, wherein the first data structure is a hierarchical data structure and comprises a plurality of page tables.

4. The method of claim 1, wherein the virtual address descriptor includes a reference to an object that includes a reference to the instruction data required by a process that requested the instruction data to execute the computer-executable instruction.

5. The method of claim 1, wherein the hierarchical data structure is a balanced tree data structure.

6. The method of claim 1, wherein the hierarchical data structure comprises a plurality of virtual address descriptors and wherein the plurality of virtual address descriptors are arranged as nodes of the hierarchical data structure.

7. The method of claim 1, further comprising:
updating a translation lookaside buffer (TLB) to include the mapping of a virtual address to the physical address.

8. The method of claim 1, wherein the second data structure is separate and distinct from the first data structure and from the page frame database page fault is handled in constant time.

9. The method of claim 1, wherein the page fault is generated subsequent to a TLB miss associated with the request for instruction data.

10. The method of claim 9, wherein the page fault is caused by a process that requested the instruction data not having access permission to access the page.

11. A non-transitory computer-readable storage medium comprising computer-executable instructions for execution by one or more processors of an electronic device, the computer-executable instructions for:
detecting a page fault associated with a request for instruction data directed to a virtual address;
in response to detecting the page fault:
obtaining a page table from a first data structure, wherein the page table maps the virtual address to a page associated with a physical address;
retrieving metadata from a page frame entry in a page frame database using the physical address associated with the instruction data, wherein the page frame database is separate and distinct from the page table and wherein the page frame database comprises a plurality of page frame entries associated with two or more applications of a plurality of applications running on the operating system associated with the instruction data; and
directly looking up a virtual address descriptor from within a second data structure arranged in a hierarchical data structure manner using the metadata, wherein the metadata comprises a pointer that is used to directly lookup the VAD without performing a VAD walk of the second data structure;
accessing the virtual address descriptor to retrieve the instruction data;
loading the retrieved instruction data into a page associated with the physical address; and
executing a computer-executable instruction using the loaded instruction data.

12. A device, comprising:
one or more processors and a memory management unit, the one or more processors configured for:
detecting a page fault associated with a request for instruction data directed to a virtual address;
in response to detecting the page fault:
obtaining a page table from a first data structure, wherein the page table maps the virtual address to a page associated with a physical address;
retrieving metadata from a page frame entry in a page frame database using the physical address associated with the instruction data, wherein the page frame database is separate and distinct from the page table and wherein the page frame database comprises a plurality of page frame entries associated with two or more applications of a plurality of applications running on the operating system associated with the instruction data; and
directly looking up a virtual address descriptor (VAD) from within a second data structure arranged in a hierarchical manner data structure using the metadata, wherein the metadata comprises a pointer that is used to directly lookup the VAD without performing a VAD walk of the second data structure;
accessing the virtual address descriptor to retrieve the instruction data;
loading the retrieved instruction data into a page associated with the physical address; and
executing the computer-executable instruction using the loaded instruction data.

13. The method of claim 1, wherein the metadata includes an offset within the VAD.

14. The method of claim 1, wherein the instruction data is stored in secondary memory.

15. The method of claim 1, wherein the second data structure includes a plurality of virtual address descriptors organized as nodes in a hierarchical tree structure.

16. The method of claim 15, wherein each of the nodes includes a pointer to a location in a control area data structure that maps the location of data stored in secondary memory.

* * * * *